United States Patent [19]
Mizukawa

[11] 4,005,460
[45] Jan. 25, 1977

[54] PHOTOGRAPHIC CAMERA WITH COVER FOR EXPOSURE CONDITIONS SELECTOR MEANS

[75] Inventor: Shigeo Mizukawa, Ageo, Japan

[73] Assignee: Fuji Photo Optical Co., Ltd., Omiya, Japan

[22] Filed: June 10, 1975

[21] Appl. No.: 585,653

[30] Foreign Application Priority Data

June 19, 1974 Japan ............................ 49-69493

[52] U.S. Cl. ........................... 354/202; 354/195; 354/289
[51] Int. Cl.² ................................. G03B 3/00
[58] Field of Search .............. 354/26, 27, 28, 29, 354/30, 195, 228, 230, 231, 202, 266, 268, 289; 240/1.3

[56] References Cited

UNITED STATES PATENTS

| 3,125,011 | 3/1964 | Hennig | 354/30 |
| 3,273,479 | 9/1966 | Jakob | 240/1.3 |
| 3,303,765 | 2/1967 | Jakob et al. | 354/58 |
| 3,913,113 | 10/1975 | Yamashita | 354/195 |

Primary Examiner—L. T. Hix
Assistant Examiner—Alan Mathews

[57] ABSTRACT

On the camera body of a photographic camera provided with manually operable exposure controlling dials or knobs, is provided a cover which can be closed to cover the dials or knobs to prevent them from being manually operated. When the cover is open, the dials and knobs can be manually operated as desired. When the cover is closed, the exposure controlling dials and knobs are in the position to effect a normal exposure.

8 Claims, 11 Drawing Figures

PHOTOGRAPHIC CAMERA WITH COVER FOR EXPOSURE CONDITIONS SELECTOR MEANS

BACKGROUND OF THE INVENTION

1. Field of the Invention

This invention relates to a photographic camera, and more particularly to a photographic camera suitable for amateur use provided with a means which prevents manual operation of controlling rings, dials or levers thereof while holding them in the positions of normal photographing condition.

2. Description of the Prior Art

The operation of a photographic camera is very difficult for those not skilled in the photographic art. For instance, it is at least necessary to adjust a distance ring, a diaphragm controlling ring and a shutter speed setting dial before depressing the shutter release button. Even in a camera provided with an automatic exposure control means, it is necessary to set a film sensitivity setting dial, and either a diaphragm controlling ring or a shutter speed setting dial before the depression of the shutter release button.

In order to reduce the presetting operations to the minimum number possible, there have been developed full automatic cameras in which setting of the film sensitivity and selection of the diaphragm and shutter speed require no manual operation at all. The full automatic camera, however, has numerous disadvantages for photographers who are familiar with or skilled in the photographic art.

In order to eliminate the above-mentioned disadvantages, it has been known in art to provide a photographic camera which is provided with a changeover means for effecting a changeover between manual operation mode and automatic control mode so that the camera may be made either manually operable or automatically controlled. Even this type of automatic camera provided with a changeover means is disadvantageous for instance when the camera is handed to an unskilled person after the controlling rings or dials thereof have been properly set manually by a skilled photographer so that a picture of the photographer may be taken by the unskilled person at the exposure conditions set by the photographer, since the manually operable rings or dials are likely to be accidentally moved while the camera is being handled by the unskilled person.

SUMMARY OF THE INVENTION

In view of the above observations and description of the conventional photographic camera, it is the primary object of the present invention to provide a photographic camera suitable for amateur use which can be manually operated and is provided with a means for preventing the manual operation thereof after the operating members have been properly set.

Another object of the present invention is to provide a manually operable photographic camera suitable for amateur use which is provided with a means for automatically setting the controlling rings and dials to the positions of normal photographing conditions and preventing the same from being accidentally moved after they have been set.

The above objects of the present invention are accomplished by providing a movable member on a camera body which is movable between two positions in one of which the member allows manual operation of various controlling means on the camera for manually selecting desired conditions of exposure and in the other of which the member holds the controlling means in the position to obtain a normal exposure and prevents the manual operation thereof. In a preferred embodiment of the invention, the movable member is hinged on the top of the camera body as a cover therefor.

When a person skilled in the photographic art uses the camera in accordance with the present invention as described above, the movable member is put in said first position to allow the manual operation of the controlling members and the photographer selects desired conditions of exposure by turning a shutter speed dial and a diaphragm controlling ring. When a person not skilled in the photographic art uses the camera, the movable member is put in said second position to bring the controlling means in the position to obtain a normal exposure and prevents the manual operation thereof. The "normal exposure" referred to above means a condition of exposure in which the shutter speed is sufficiently high and the $f$-number of the diaphragm is sufficiently large to obtain a properly large focal depth so that a sharp picture of an object under normal illumination can be taken by an unskilled person. Further, since the controlling means are prevented from being manually operated when the movable member is in said second position, there is no fear of accidental movement of the various controlling means while the camera is being handled by the unskilled person.

DESCRIPTION OF THE PREFERRED EMBODIMENTS

Figure 1:
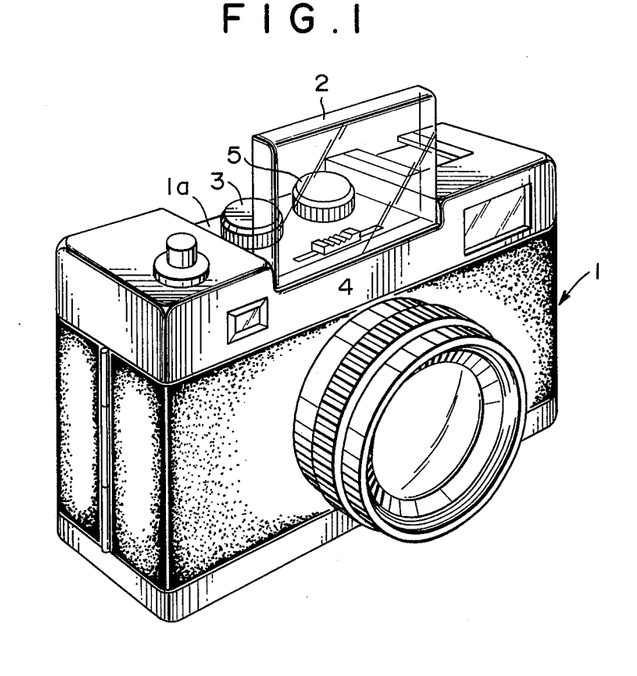
FIG. 1 is a perspective view of the camera in accordance with an embodiment of the present invention.
Figure 2:
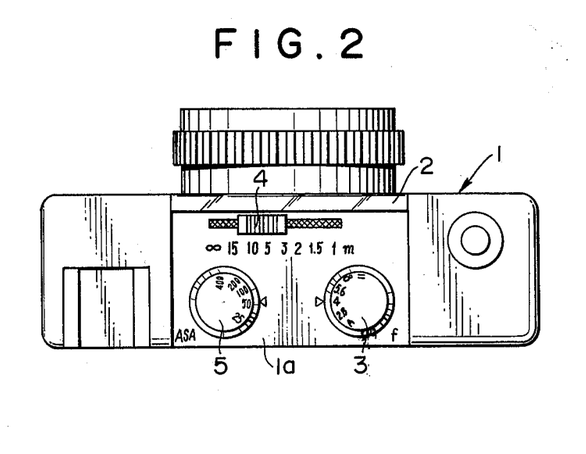
FIG. 2 is a top plan view of the camera as shown in FIG. 1.

Referring to FIGS. 1 and 2 showing an embodiment of the camera of this invention, a camera body 1 is provided with a hinged cover 2 on the top face 1a thereof. On the top face 1a of the camera body 1 are provided various controlling means such as an auto-manual changeover dial 3, a distance adjusting knob 4 and a film sensitivity setting dial 5. Since the cover 2 covers all these controlling means when closed, the photographer cannot operate these controlling means when the cover 2 is closed. When the cover 2 is open, the controlling means are exposed and accordingly the photographer can operate the controlling means as desired.

When a person not skilled in the photographic art uses the camera as described above, the auto-manual changeover dial 3 is set to the "auto" side, the distance adjusting knob 4 is set to the distance of 3 to 5 meters, the film sensitivity setting dial 5 is set to the position of the sensitivity of the film loaded in the camera and then the cover 2 of the camera is closed so that the dials 3 and 5 and the knob 4 will not be accidentally moved while being handled by the unskilled person. The cover 2 may be transparent or semi-transparent, or opaque. Preferably, the cover 2 is made of transparent plastic material.

Figure 3:
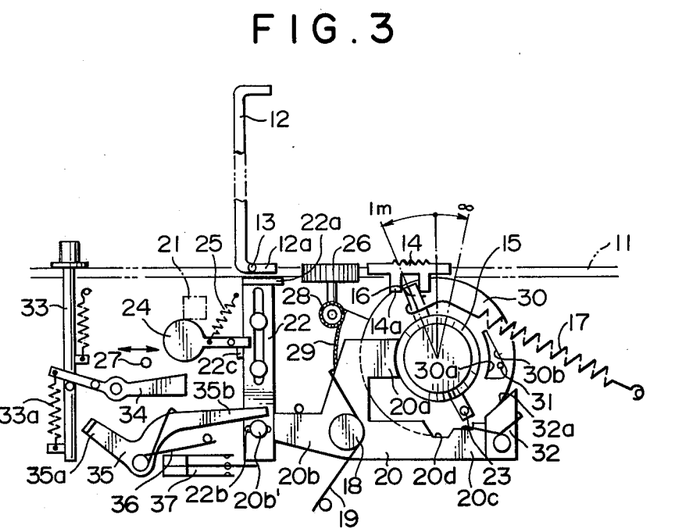
FIG. 3 is a front view showing the internal mechanism of the camera as shown in FIGS. 1 and 2.
Figure 4:
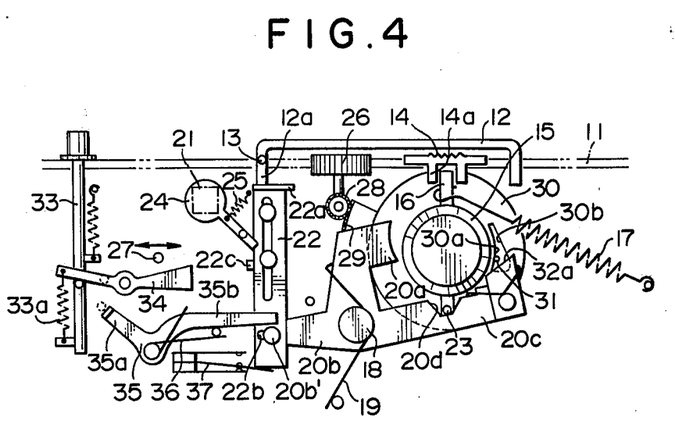
FIG. 4 is a front view showing the mechanism as shown in FIG. 3 in which the movable member is in the closed position.

Referring to FIGS. 3 and 4 which show the internal mechanism of the camera provided with the cover as shown in FIGS. 1 and 2. The internal mechanism operates to set the various controlling means in the position of normal exposure condition in response to closure of a cover 12 hinged at a hinge pivot 13. This camera is provided with a range finder of double image type in which the distance is adjustable between 1m and infinity with a distance adjusting knob 14, a programmed shutter which is automatically controlled and can be manually operated (the diaphragm is manually operable when a flash bulb is used), and a film sensitivity setting means for setting the exposure control means to operate properly with respect to the sensitivity of the film loaded in the camera.

Referring to FIG. 3, a cover 12 is rotatably mounted to the top end plate 11 of the camera with a hinge pivot 13. A slidable distance adjusting knob 14 which is operable from outside is provided on the top end plate 11 of the camera. The slidable knob 14 has a downwardly projected fork portion 14a. A pin 16 fixed to a lens barrel 15 is engaged with the fork portion 14a of the slidable knob 14. The lens barrel 15 is urged to rotate in the clockwise direction (the direction of rotation causing the focused distance of the lens to approach infinity) by means of a tension spring 17 tensioned between the pin 16 and a part of the camera body. A three-armed lever 20 rotatably mounted on a pivot 18 and urged clockwise by a spring 19 is provided in the camera so that one arm 20a thereof abuts on the lens barrel 15 to brake the rotation thereof. By sliding the slidable knob 14 with the fork portion 14a thereof engaged with said pin 16 on the lens barrel 15, the lens barrel 15 is rotated to vary the focused distance of the lens mounted therein. The lens barrel 15 is further associated with a double image type range finder (not shown) represented by a viewfinder 21 by way of a conventionally known interlocking mechanism.

Said cover 12 has a bent portion 12a extending at substantially a right angle to one end thereof in the vicinity of said pivot 13. A vertically slidable member 22 is provided in the camera body with the top end thereof bent as indicated by 22a and engaged with the bent portion 12a of the cover 12. When the cover 12 is moved from the open position as shown in FIG. 3 to the closed position as shown in FIG. 4, the vertically slidable member 22 is pushed downward. The lower part of the vertically slidable member 22 is provided with a slot 22b in which a pin 20b' fixed to a second arm 20b of said three-armed lever 20 is inserted so that the three-armed lever 20 is rotated counterclockwise when the vertically slidable member 22 is pushed downward overcoming the force of the spring 19. When the vertically slidable member 22 is moved downward, the three-armed lever 20 is rotated counterclockwise and the first arm 20a is separated from the lens barrel 15 to allow it to be rotated clockwise by the tension spring 17 until the lens barrel 15 be brought into the position of infinity, i.e. where the focused distance of the lens becomes the shortest. However, the lens barrel 15 is not rotated up to the limit of rotation but stopped short by a pin 23 fixed thereto which comes into engagement with a recess 20d formed on one side into a third arm 20c of the three-armed lever 20, as shown in FIG. 4. The position where the lens barrel 15 is stopped is a predetermined normal position where the focused distance of the lens is the most appropriate for taking pictures of an object under ordinary conditions. For instance, the distance scale in this case is set at 5m. Thus, when the cover 12 is closed, the distance is automatically set at the normal condition as 5m. When the lens barrel 15 has been in the position of infinity, the pin 23 on the lens barrel 15 is moved along a slope of the recess 20d of the third arm 20c and the lens barrel 15 is rotated counterclockwise overcoming the tension of the spring 17 and set at the normal position to effect said normal distance adjustment.

The vertical slidable member 22 is provided on one side thereof with a projection 22c extending perpendicular thereto. A light intercepting member 24 pivotally provided and urged by a tension spring 25 to close said viewfinder 21 is engaged with the projection 22c on the vertically slidable member 22 so that the viewfinder 21 may be closed when the slidable member 22 is moved downward as shown in FIG. 4. When the light intercepting member 24 closes the viewfinder 21 of the double image type, the function of the range finder which forms double images in the viewfinder system is nullified and only a single image is viewed through the viewfinder.

On the top end plate 11 of the camera body is rotatably provided an auto-manual changeover dial 26 for controlling exposure. The changeover dial 26 is provided with a scale similar to that of the dial 3 as shown in FIG. 2 on which at least the mark "A" and some other numerals indicating f-numbers are indicated. When the changeover dial 26 is set at the mark "A" indicating automatic exposure control, the exposure control system is operated to properly select one of the programed combinations of f-numbers and shutter speeds according to the position of a deflected pointer 27 of an exposure meter (not shown). When an f-number is manually selected by turning the changeover dial 26, the shutter speed is determined for instance to obtain a proper exposure with an electronic flash or flash bulb light, e.g. 1/30 sec.

As shown in FIG. 3, a pinion 28 is provided under the auto-manual changeover dial 26. The pinion 28 is meshed with the dial 26 by way of an appropriate gear mechanism (not shown) such as a set of bevel gears. A fan-shaped portion having on the periphery thereof teeth 29 of an auto-manual changeover ring 30 is meshed with the pinion 28 as shown in FIG. 3. The auto-manual changeover ring 30 is provided with a cam hole means 30a, 30b engaged with a cam follower pin 31 extending therethrough. When the dial 26 is set at the position of "A", the pin 31 is engaged with the cam portion 30a, and when the dial 26 is in the position of manually selected f-numbers, the pin 31 is engaged with the cam portion 30b. The cam follower pin 31 functions to effect automatic exposure control by use of well known control means employing predetermined programed combinations of the diaphragm and the shutter speed, and manual setting of the diaphragm in accordance with the position thereof determined by the cam means 30a, 30b.

An actuating lever 32 having a ramp end 32a is provided at the free end of the third arm 20c of the three-armed lever 20. The ramp end 32a is brought into slide engagement with the pin 31 when the three-armed lever 20 is rotated counterclockwise. As shown in FIG. 4, when the three-armed lever 20 is rotated sufficiently in the counterclockwise direction, the cam follower pin 31 is moved to be engaged with the cam portion 30a wherein the pin 31 effects the automatic exposure control. Therefore, when the cover 12 is closed, the camera is automatically switched to automatic exposure control.

As shown in FIG. 3, a cam 34 for detecting the position of the pointer 27 of an exposure meter is associated with a shutter release rod 33 by means of a tension spring 33a so that counterclockwise rotation of the cam 34 is stopped by the pointer 27. Automatic exposure control is performed by setting the shutter speed relative to the angle of rotation of the cam 34 in accordance with the predetermined program. In the embodiment shown in FIGS. 3 and 4, a device is employed for limiting the shutter speed to the higher speeds so that picture blur can be prevented when the camera is used by an unskilled person. An exposure control lever 35 having a bent end 35a on one side and an arm 35b on the other side is pivotally provided in the camera with the arm 35b engaged with the pin 20b' of the second arm 20b of the lever 20. When the pin 20b' of the arm 20b is moved down by the downward movement of the slidable member 22, the exposure control lever 35 is rotated clockwise by spring 36 so that said bent end 35a may be brought into a position to limit or stop the counterclockwise rotation of the cam 34. Thus, the counterclockwise rotation of the cam 34 is limited to effect only high shutter speed when the cover 12 is closed. Therefore, it becomes possible to change the exposure range of 1/500 sec-F16 to 1/30 sec-F2.8 to the range of 1/500 sec-F16 to 1/125 sec-F5.6 automatically upon closure of the cover 12. The narrowed exposure range is more appropriate for those not skilled in the photographic art.

Figure 5:
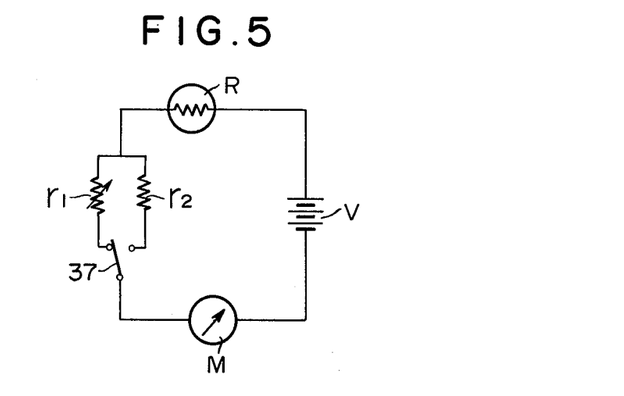
FIG. 5 is a circuit view showing an electric circuit employed in the above embodiment of the camera as shown in FIGS. 1 to 4.

The camera as shown in FIG. 3 is further provided with a means for effecting a changeover in the film sensitivity setting means between a fixed sensitivity and a variable sensitivity. A changeover switch 37 is provided under the lower end of the vertically slidable member 22 so that the changeover switch 37 is switched by the downward movement of the slidable member 22. As shown in FIG. 5, the changeover switch 37 is connected between a parallel circuit, comprised of a fixed resistor $r_2$ and a variable resistor $r_1$, and an exposure meter M of an exposure measuring circuit comprising a power source V, a photoreceptor R for measuring illumination, said parallel circuit of the fixed resistor $r_2$ and a variable resistor $r_1$, said changeover switch 37 and said exposure meter M. When the vertically slidable member 22 is moved downward by the closure of the cover 12, the changeover switch 37 is switched from the variable resistor $r_1$ to the fixed resistor $r_2$. The fixed resistor $r_2$ is set, for instance, to effect exposure control on the base of the film sensitivity of ASA 100. When the cover 12 is open, the variable resistor $r_1$ is connected in the circuit to make it possible to manually select or set the film sensitivity.

From the above description of the preferred embodiment of the invention, it will be apparent to those skilled in the art that the automatically controlled camera is put into two different states by simply opening and closing a hinged cover on the camera body, one of said states being a full automatic state and the other being a manual or semi-automatic state. It will be understood by those skilled in the art that the number of controlling means on the camera body to be manually operated and the kind or function thereof are not limited to those as described in the above embodiment but may be varied in accordance with various demands.

Figure 6:
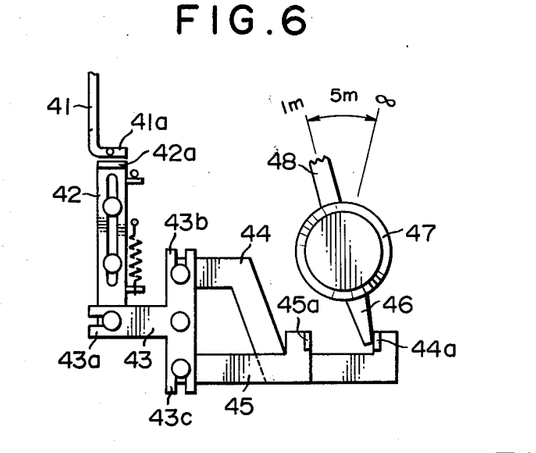
FIG. 6 is a fragmentary front view showing another embodiment of a focus adjusting mechanism employed in the camera of this invention.
Figure 7:
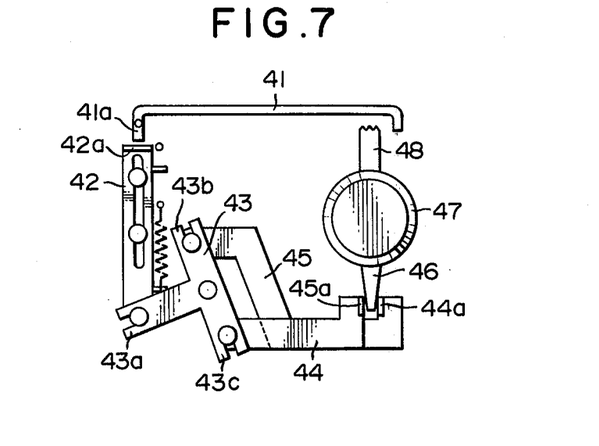
FIG. 7 is a front view of the focus adjusting mechanism as shown in FIG. 6 in another state thereof.

FIGS. 6 and 7 show another embodiment of a focus adjusting mechanism employed in the present invention which is put into the normal distance state upon closure of a cover on the camera.

Referring to FIG. 6, a bent end 41a of a cover 41 is brought into engagement with a bent top end 42a of a vertically slidable member 42 when the cover 41 is closed. The lower end of the vertically slidable member 42 is engaged with a forked end 43a of a T-shaped lever 43 so that the T-shaped lever 43 may be rotated counterclockwise upon downward movement of the slidable member 42. The other two ends 43b and 43c of the T-shaped lever 43 are engaged respectively with two setting levers 44 and 45. The setting levers 44 and 45 are provided with setting portions 44a and 45a to be brought into engagement with a projection 46 of a lens barrel 47. The lens barrel 47 is further provided with a distance adjusting knob 48. The lens barrel 47 is brought to a predetermined normal position where the distance adjusting knob 48 is at the position of 5m, for instance, by said setting levers 44 and 45 as shown in FIG. 7, when the cover 41 is closed and the slidable member 42 is moved downward to rotate the T-shaped lever 43 counterclockwise. The setting levers 44 and 45 are guided to move in the manner as shown in FIGS. 6 and 7 by a proper linear guide means. Thus, the lens barrel 47 is always brought to the normal position wherever the lens barrel may be positioned prior to closing of the cover 41.

Figure 8:
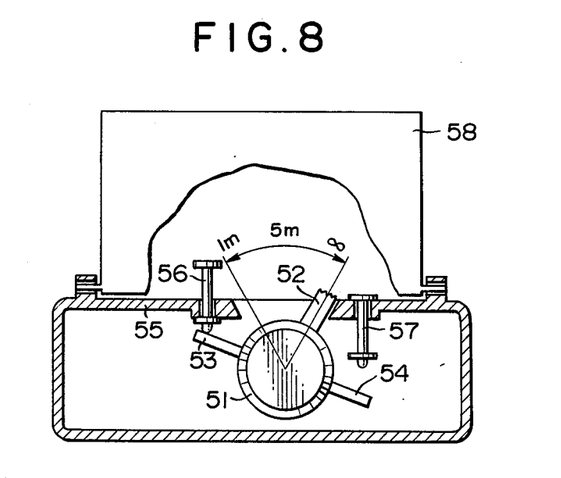
FIG. 8 is a front view partly in section showing a still different embodiment of the focus adjusting mechanism employed in the camera of this invention.
Figure 9:
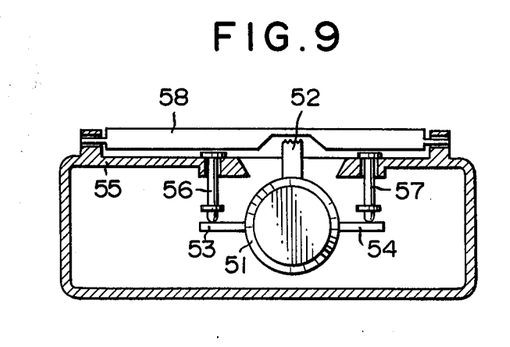
FIG. 9 is a front view partly in section of the mechanism as shown in FIG. 8 in another state thereof.

FIGS. 8 and 9 show a still different embodiment of the focus adjusting mechanism employed in the camera of the present invention which is also brought to the normal position upon closure of the cover on the camera body.

Referring to FIG. 8, a lens barrel 51 is provided with a distance adjusting knob 52 and rotated thereby to adjust the focused distance of the lens from the distance of 1m to infinity. The lens barrel 51 is provided with two pins 53 and 54 fixed thereto. The two pins 53 and 54 are engageable with two vertically slidable pins 56 and 57 mounted on the camera body 55. On the camera body 55 is provided a hinged cover 58 which is moved between a closed position in which the vertically slidable pins 56 and 57 are pushed inward to the lower positions by the cover 58 and an open position which the vertically slidable pins 56 and 57 are made free to move upward to project out of the camera body 55.

When the cover 58 is opened and the distance adjusting knob 52 is in the position of infinity, the pin 53 is in the higher position to raise the vertically slidable pin 56. Then, as the cover 58 is closed as shown in FIG. 9, the cover 58 pushes the upwardly projected pin 56 downward to rotate the lens barrel 51 counterclockwise and bring the distance adjusting knob 52 to the position of shorter distance. When the cover 58 is completely closed, the two pins 56 and 57 are in the lowermost position where both the pins 56 and 57 are in contact with the pins 53 and 54 fixed to the lens barrel 51 and the distance adjusting knob 52 is in the normal distance position, i.e. 5m.

Figure 10:
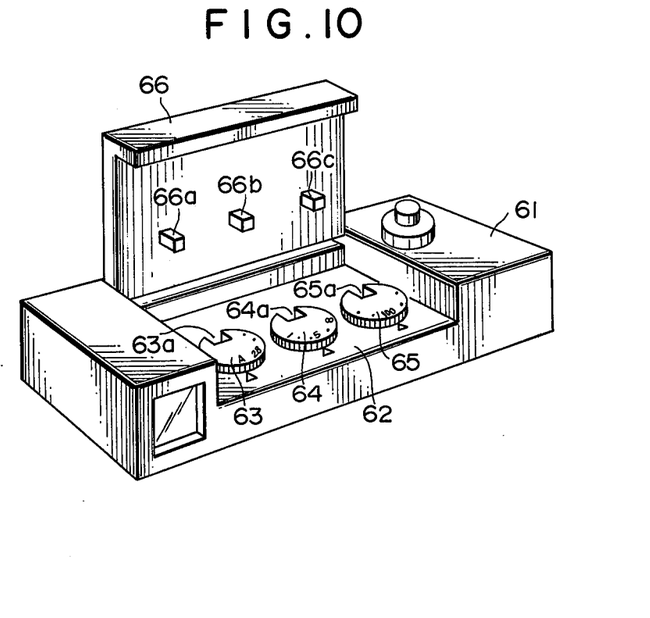
FIG. 10 is a fragmentary perspective view of a part of the top of the camera in accordance with another embodiment of the present invention.

Another embodiment of the present invention in which the structure of the camera is simplified is shown in FIG. 10. Referring to FIG. 10, in the recessed portion 62 of the top of the camera body 61 are provided an auto-manual changeover dial 63, a distance adjusting knob 64 and a film sensitivity setting dial 65. The number and kind of the controlling members are properly selected according to the particular requirements for the camera. On the recessed portion 62 is provided a hinged cover 66. When the cover 66 is open, the controlling members such as the dials 63, 65 and the knob 64 are manually operable as desired. The inside surface of the cover 66 is provided with projections 66a, 66c and 66b which are brought into engagement with cut-away portions 63a, 65a and 64a of the dials 63 and 65 and knob 64 when the cover 66 is closed. When the camera is used by those not skilled in the photographic art, the dials and knob are rotated so that the cut-away portions 63a, 65a and 64a thereof can be put into engagement with the projections 66a, 66c and 66b on the inside surface of the cover 66. Then, the cover 66 is closed. If one of the dials or the knob is not correctly rotated to allow the cut-away portion thereof engage with the corresponding projection, the cover 66 cannot be completely closed. This embodiment of the invention is particularly advantageous in its simple structure.

Figure 11:
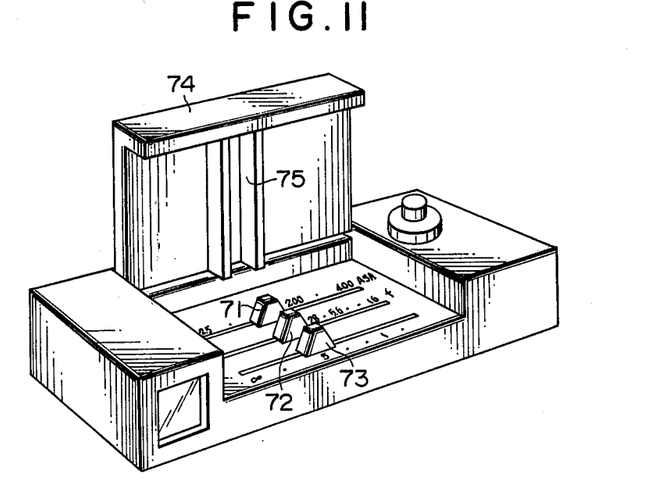
FIG. 11 is a fragmentary perspective view of a part of the top of the camera in accordance with still another embodiment of the present invention.

Still another embodiment of the present invention is shown in FIG. 11, which is a variation of the embodiment shown in FIG. 10. In this embodiment, a knob 71 for setting the film sensitivity, a knob 72 for selecting the diaphragm opening and making the changeover between "automatic" and "manual" exposure control, and the knob 73 for adjusting the distance are all made in the form of linearly slidable knobs moving along straight slits parallel to each other. A cover 74 is hinged on the camera body to be moved between a closed position to cover the knobs 71, 72 and 73 and an open position to allow the manual operation of the knobs. The cover 74 is provided on the inside surface thereof with a groove 75 which is brought into engagement with said knobs 71, 72 and 73 when the knobs are aligned laterally as shown in FIG. 11. In the aligned position where the knobs 71, 72 and 73 are in engagement with the groove, said normal exposure is obtained. Therefore, the camera in accordance with this embodiment of the invention can be used by anyone without misoperation by simply closing the cover 74 on the camera body.

I claim:

1. A photographic camera comprising a camera body, an exposure controlling means provided in the camera body for controlling exposure of film loaded in the camera body, an exposure condition selecting means provided on the camera body for selecting between normal exposure condition and other exposure condition, and a cover provided on the camera body movable between an open and a closed position, in which closed position the cover prevents said exposure condition selecting means from being manually operated and causes said exposure controlling means to operate in the state of normal exposure condition, and in the open position the cover allows said exposure condition selecting means to be manually operated.

2. A photographic camera as claimed in claim 1 wherein said cover is hinged to the camera body and movable between a closed position to cover said exposure condition selecting means and an open position to expose said exposure condition selecting means.

3. A photographic camera as claimed in claim 2 wherein said cover hinged to the camera body is provided with a portion which moves into the camera body when the cover is closed, and a movable member engaged with said portion to be moved when said cover is closed is provided in the camera body, and said exposure controlling means is provided in the camera body in engagement with said movable member so that the exposure controlling means may effect a normal exposure condition when the cover is closed.

4. A photographic camera as claimed in claim 3 wherein said exposure controlling means is a lever engaged with said movable member to limit the shutter speed in its higher range when the cover is closed.

5. A photographic camera as claimed in claim 3 wherein said exposure controlling means is a means engaged with said movable member to position a focusing ring at an intermediate position thereof.

6. A photographic camera as claimed in claim 3 wherein said exposure controlling means is an electric switch connected in an exposure control circuit for selecting a resistor among at least two resistors of different resistance for determining the exposure condition based on the film sensitivity of the film loaded in the camera.

7. A photographic camera as claimed in claim 2 wherein a movable member is provided on the camera body to be depressed by the cover when the cover is closed, said movable member being engaged with a focusing ring so that the focusing ring may be rotated to an intermediate position when the cover is closed.

8. A photographic camera as defined in claim 2 wherein the inside surface of the cover is provided with a projection or surface irregularity, and the exposure condition selecting means is engaged with the surface irregularity whereby the exposure condition selecting means is automatically held in the normal position upon closure of the cover.

* * * * *

UNITED STATES PATENT AND TRADEMARK OFFICE
CERTIFICATE OF CORRECTION

PATENT NO. : 4,005,460
DATED : January 25, 1977
INVENTOR(S) : SHIGEO MIZUKAWA

It is certified that error appears in the above-identified patent and that said Letters Patent are hereby corrected as shown below:

[30] Foreign Application Priority Data

June 18, 1974  Japan  49-69493

Signed and Sealed this

Twenty-fourth Day of May 1977

[SEAL]

Attest:

RUTH C. MASON
Attesting Officer

C. MARSHALL DANN
Commissioner of Patents and Trademarks